(No Model.)
J. F. HAYLES.
ANIMAL MUZZLE.
No. 561,051.   Patented May 26, 1896.
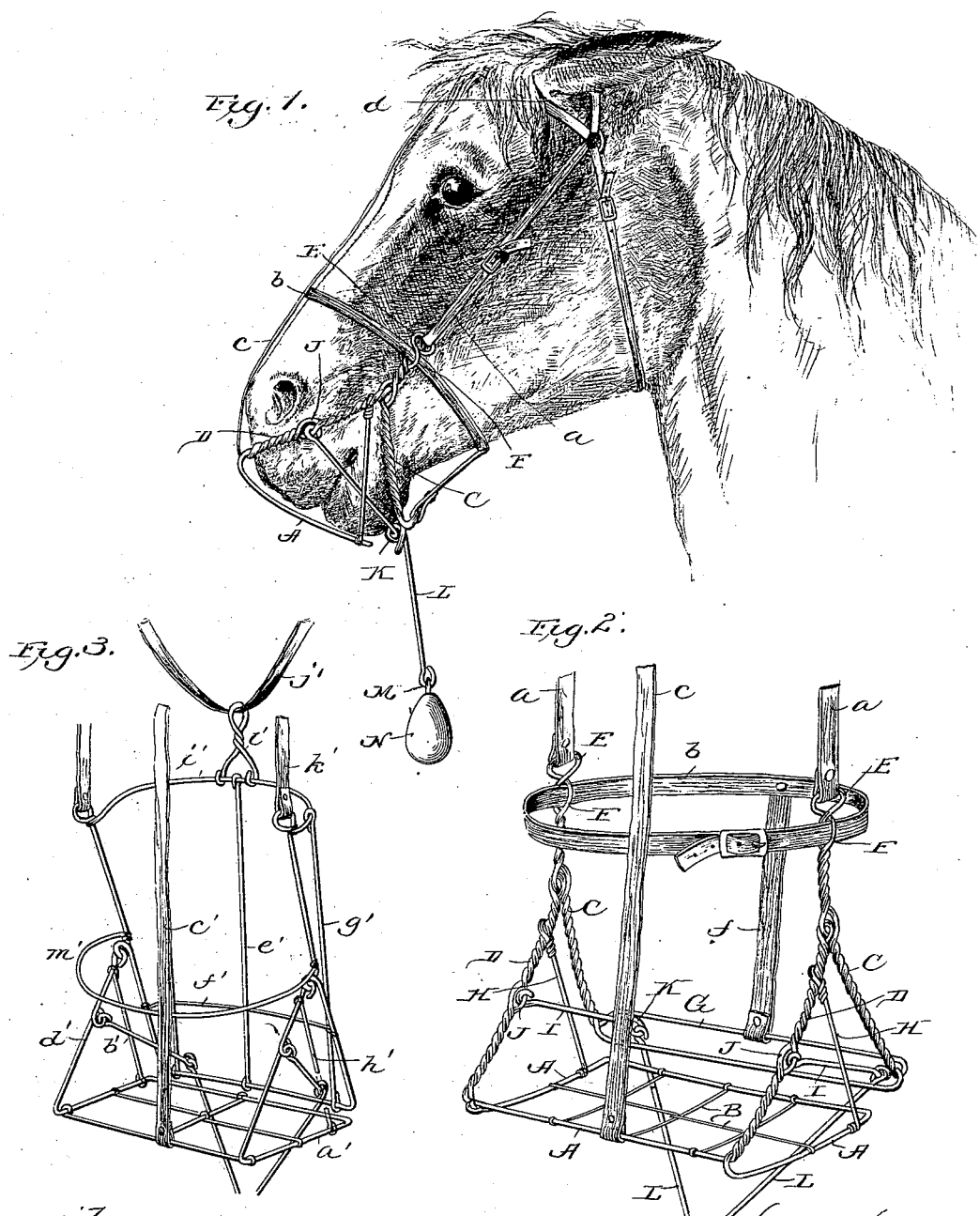

UNITED STATES PATENT OFFICE.

JOHN FRANKLIN HAYLES, OF EVERGREEN, ALABAMA, ASSIGNOR OF ONE-HALF TO LUMAN W. SAVAGE, OF SAME PLACE.

ANIMAL-MUZZLE.

SPECIFICATION forming part of Letters Patent No. 561,051, dated May 26, 1896.

Application filed September 9, 1895. Serial No. 561,983. (No model.)

*To all whom it may concern:*

Be it known that I, JOHN FRANKLIN HAYLES, a citizen of the United States, residing at Evergreen, in the county of Conecuh and State of Alabama, have invented certain new and useful Improvements in Animal-Muzzles; and I do hereby declare the following to be a full, clear, and exact description of the invention, such as will enable others skilled in the art to which it appertains to make and use the same.

This invention relates generally to muzzles for animals, and particularly to a muzzle for preventing horses, cows, and other animals from injuring and destroying growing corn, wheat, and other standing grain and fruit and ornamental trees which may be growing in or near the field where the animal is turned to graze; and it has for its object to provide a simple, durable, comparatively inexpensive, and efficient device readily attachable to an ordinary halter or bridle and adapted to completely muzzle the animal when its head is raised from the ground; and it consists of the parts and combinations of parts hereinafter fully described and claimed.

In the accompanying drawings, forming a part of this specification, Figure 1 is a side elevation of my improved muzzle in its closed position on the head of a horse; Fig. 2, a perspective view of the same removed therefrom, and Fig. 3 a perspective view showing a modified form of construction.

Similar letters refer to similar parts in all the views.

The frame of the muzzle-mouthpiece consists, preferably, of a single heavy wire A, bent in rectangular form in outline and slightly curved to correspond to the muzzle of the animal, as shown in Fig. 2, the space within said frame being crossed and recrossed by a wire or wires B, forming a screen of a mesh of sufficient closeness to prevent the animal from projecting its tongue therethrough. The ends of the wire A forming the frame are carried from the upper corners of the frame upwardly to a point in rear of or above the animal's mouth and passed through an opening or link formed in the curved cheek-piece C, and then down again to the frame, said wire being twisted on itself, as shown, to form the stiff bars D. The cheek-pieces C also consist, preferably, of a single heavy wire twisted on itself and formed with the loops E at each upper end thereof for attachment to the cheek-straps *a* of the bridle or halter and with loops F for the nose-piece *b* of the bridle or halter. The wire forming the cheek-pieces of the muzzle is twisted as described; but the part thereof which extends across and below the under lip of the animal is so bent as to form a loop G its full length, for a purpose to be described. To the loop G is attached a strap *f*, which extends to the nose-band.

H represents strengthening wires or braces, which extend from at or near the lower corners of the frame of the mouthpiece of the muzzle up to the upper ends of the bars D and are there secured. At a point about midway the bars D short bars I are loosely connected or looped, preferably in links J, formed in said bars D, and in eyes K, formed at the other ends of said bars I, the ends of bars L are linked, the lower or other ends of said bars L being linked in a staple or staples M, secured in the end of a rounded or egg-shaped weight N, which normally draws on the bars D and holds muzzle-mouthpiece in place. At the middle of the upper cross-bar of the frame of the muzzle-mouthpiece one end of a strap *c* is secured and extends up to and is secured to the head-band *d* of the bridle or halter, said strap carrying a buckle, whereby its length may be adjusted so as to hold the muzzle-mouthpiece directly over the animal's mouth, as shown in Fig. 1, from which position it is movable upwardly only and then only when the animal lowers its head sufficiently to permit the weight N to come in contact with the ground, thus relieving the muzzle-mouthpiece of the tension the weight exerts thereon and forcing said mouthpiece up and from over the mouth of the animal and permitting it to graze, the bars D thereof readily turning in the links of the bars or cheek-pieces C as on a pivot.

In the modified form shown in Fig. 3 the frame of the mouthpiece is formed of a single wire *a'*, connected by crossed wires, whose extension forms the bars $d'$, linked to the cheek-pieces $g'$, and the latter being attached to the cheek-straps $k'$ of the halter. In this construction a wire $m'$ is used instead of a nose-band, which has each of its ends attached to the cheek-pieces $g'$, and the cheek-pieces are also connected by a wire $i'$, which may be a continuation, as shown, of the wire forming the cheek-pieces $g'$, and wires $e'$ are employed to connect said wire $i'$ and the horizontal portion or lip portion of the cheek-pieces $g'$, said cheek-pieces being long enough to reach nearly the whole length of the animal's jaws and are supported by a double hook $l'$ on the head-band $j'$, which catches in the wire $i'$. The strap $c'$ extends to and is adjustably secured to the head-band, as in the first-described construction, and the links $b'$ are intended to carry a weight, (not shown,) as in said first-described construction. A brace-wire $h'$ is also used at each side of the mouthpiece.

Having thus described my invention, what I claim as new, and desire to secure by Letters Patent, is—

1. An animal-muzzle consisting of cheek-pieces adapted for connection with a halter, a mouthpiece pivotally connected to said cheek-pieces, and a weight loosely connected to said mouthpiece and having its movement guided by said cheek-pieces, substantially as described.

2. An animal-muzzle consisting of cheek-pieces having a slotted or looped lip-piece, a mouthpiece pivotally connected to said cheek-pieces, linked bars loosely connected to said mouthpiece and extending through said looped lip-piece, and a weight connected to said linked bars, substantially as described.

3. The combination, with a halter or bridle, of a muzzle consisting of cheek-pieces adapted to be secured at their upper ends to said halter or bridle and formed with a slotted or looped lip-piece, means for connecting said lip-piece and the halter or bridle, a mouthpiece pivotally connected to the cheek-pieces, a strap connecting said mouthpiece and halter or bridle, linked bars pivotally attached to the side bars of the mouthpiece and extending through and guided by the looped lip-piece, and a weight loosely attached to the free ends of said linked bars, substantially as described.

In testimony whereof I affix my signature in presence of two witnesses.

JOHN FRANKLIN HAYLES.

Witnesses:
FRANK C. GORDON,
H. W. DUNN.